(12) United States Patent
Cohen et al.

(10) Patent No.: US 8,416,948 B2
(45) Date of Patent: Apr. 9, 2013

(54) SYSTEM FOR SECURE VARIABLE DATA RATE TRANSMISSION

(75) Inventors: Aaron E. Cohen, White Bear Lake, MN (US); Keshab K. Parhi, Maple Grove, MN (US)

(73) Assignee: Leanics Corporation, Maple Grove, MN (US)

( * ) Notice: Subject to any disclaimer, the term of this patent is extended or adjusted under 35 U.S.C. 154(b) by 260 days.

(21) Appl. No.: 12/802,306

(22) Filed: Jun. 4, 2010

(65) Prior Publication Data

US 2011/0302404 A1    Dec. 8, 2011

(51) Int. Cl.
*H04L 29/06* (2006.01)
(52) U.S. Cl. ............ 380/37; 380/268; 380/46; 713/189
(58) Field of Classification Search .................. 380/37
See application file for complete search history.

(56) References Cited

U.S. PATENT DOCUMENTS

| | | | | |
|---|---|---|---|---|
| 5,208,853 | A | * | 5/1993 | Armbruster et al. ............ 705/56 |
| 6,088,456 | A | * | 7/2000 | McCracken et al. .......... 380/259 |
| 2001/0018741 | A1 | * | 8/2001 | Hogan .......................... 713/189 |
| 2002/0048364 | A1 | * | 4/2002 | Gligor et al. ..................... 380/37 |
| 2007/0016768 | A1 | * | 1/2007 | Sonnekalb .................... 713/160 |
| 2008/0137837 | A1 | * | 6/2008 | Patel ............................... 380/28 |
| 2010/0246813 | A1 | * | 9/2010 | Morris et al. .................. 380/28 |

OTHER PUBLICATIONS

Stallings, W. "Cryptography and Network Security" (fourth edition, 2006), pp. 181-188.*

* cited by examiner

*Primary Examiner* — Taghi Arani
*Assistant Examiner* — Mohammad L Rahman

(57) ABSTRACT

Secure Variable Data Rate Transceivers and methods for implementing Secure Variable Data Rate are presented. An efficient and systematic method and circuit for implementing secure variable data rate transceivers are presented. The SVDR method is based on block ciphers. An index method is presented for minimizing transmission overhead. This allows SVDR to achieve higher security by using the full cipher-mode stream.

22 Claims, 10 Drawing Sheets

Number of Augmented 0's

1000

Figure 1:
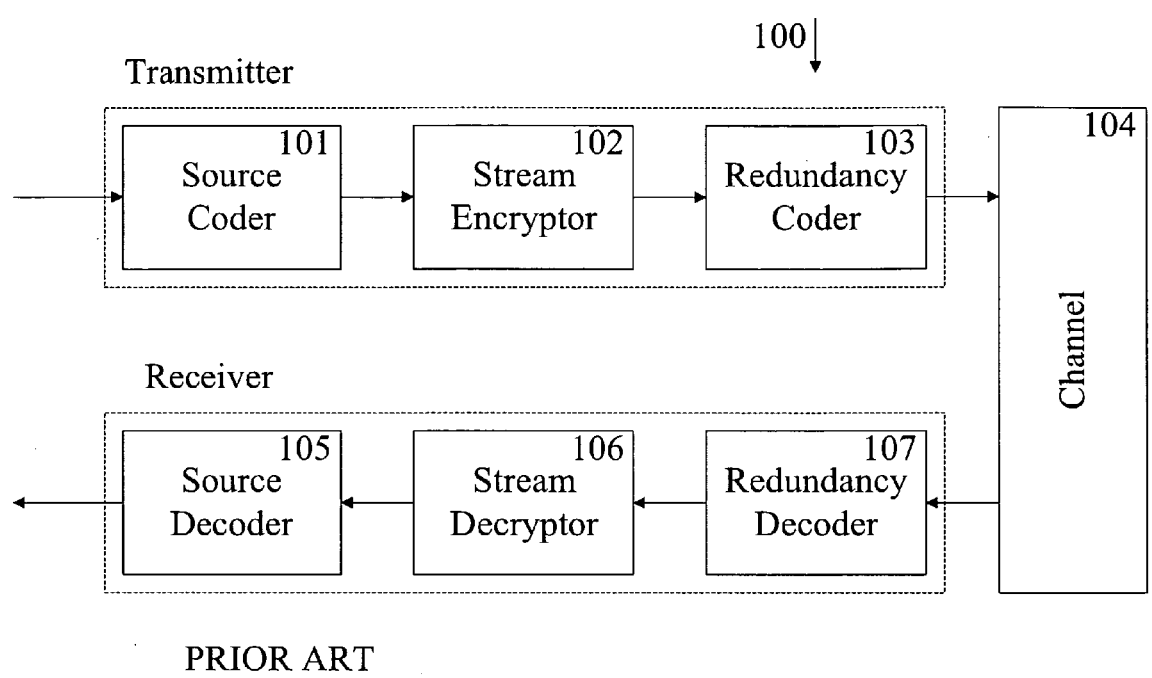

| | Possible Solutions | #bits for SN (WIN=10 blocks) | #Streams | Discarded Stream bits |
|---|---|---|---|---|
| 1 | Index by bit | 13 | 1 | 0 |
| 2 | Index separate streams by block | 4 | 7 | $\sum_{i=1}^{TotalStreams}(MAXLEN_i - LEN_i)$ |
| 3 | Index by block (Our Method) | 4 | 1 | (MAXLEN-FRAMELEN) |

Fig. 10

SYSTEM FOR SECURE VARIABLE DATA RATE TRANSMISSION

STATEMENT REGARDING FEDERALLY-SPONSORED RESEARCH AND DEVELOPMENT

This invention was made with Government support from the Navy under Contract No. N00039-06-C-0096, SBIR Phase I: Tactical Secure Voice/Variable Data Rate Inter Working Function.

FIELD OF THE INVENTION

The present invention relates to data processing, cryptography, transmission, networking, and digital communication. More specifically, it is related to secure voice over Internet Protocol.

BACKGROUND OF THE INVENTION

Voice over Internet Protocol (VoIP) was developed as a feature in the original Request for Comments (RFC) document that defines the Internet Protocol in the early 1980's (IETF RFC 760: Information Sciences Institute at University of Southern California, "DoD Standard Internet Protocol," January 1980). Early versions of VoIP made use of relatively inferior voice compression technologies and suffered from many of the same network problems we are facing today such as Quality of Service (QoS), jitter, dropped calls, latency, and bandwidth constraints. While many of these problems have been addressed in more recent networking technology, security has remained a primary afterthought for VoIP.

There are currently two standards that define voice services over the Internet. The first is H.323 which is standardized by the ITU-T (ITU-T H.323 Standard, "Packet-based multimedia communications systems", June 2006). The second is session initiation protocol (SIP) which was standardized by the IETF as RFC 3261 (IETF RFC 3261: J. Rosenberg, H. Schulzrinne, G. Camarillo, A. Johnston, J. Peterson, R. Sparks, M. Handley, and E. Schooler, "SIP: Session Initiation Protocol", June 2002). SIP was adopted by the 3GPP in 2001. For security, H.323 requires the use of H.235 while SIP has been primarily open and allowed VoIP implementers to use cryptography methods such as SRTP, IPSec, and custom cryptography methods (ITU-T H.235.1 Standard, "H.323 security framework: Baseline security profile," September 2005, IETF RFC 3711: M. Baugher, D. McGrew, M. Naslund, E. Carrara, and K. Norrman, "The Secure Real-time Transport Protocol (SRTP)," March 2004). Additionally, SIP uses a text configuration which makes implementing SIP easy to understand, debug, and modify to meet customer's needs.

In speech applications, a CODEC's performance is measured by its Mean Opinion Score (MOS). The MOS method makes use of a combined average of subjective listeners. In general this method does not always lead to the same result but it can determine the difference between various CODEC performances. To increase the repeatability of measuring the MOS, the ITU-T came out with several standards with the most recent being ITU-T P.862 the perceptual evaluation of speech quality (PESQ) (ITU-T P.862, Perceptual evaluation of speech quality (PESQ): An objective method for end-to-end speech quality assessment of narrow-band telephone networks and speech codecs, Amendment 2, November 2005). While originally developed for narrowband speech it has been extended to wideband speech in P.862.2. In addition to the MOS measurements, to account for various other factors inherent to voice over Internet protocol (VoIP), the ITU-T developed G.107 the E-model which takes into account impairments from various sources such as delay (ITU-T G.107: The E-model, a computational model for use in transmission planning, August 2008). The E-model yields a better prediction for quality of service (QoS) for VoIP.

Narrowband speech is primarily dominated by three different CODECs in industry. They are the adaptive multi-rate (AMR) codec for GSM, the EVRC-B codec from Qualcomm for 1xEVDO, and Speex for open source VoIP applications (3GPP TS 26.104: ANSI-C code for the floating-point Adaptive Multi-Rate (AMR) speech codec, 3GPP2 TSG-C C.R0018-C v1.0: Software Distribution for Enhanced Variable Rate Codec (EVRC), Speech Service Options 3, 68, and 70, Minimum Performance Specification January 2008, Speex: a free codec for free speech). AMR implements a discontinuous transmission method to achieve variable rate transmission. Additional rate adjustments must be made prior to using their encoder. The EVRC-B code achieves variable rate transmission by using a discontinuous transmission method like AMR. The Speex codec uses a different approach to achieve variable rate transmission. Speex bases its quantization on the actual speech which allows it to achieve better performance in variable data rate (VDR) applications. In the new ITU-T standard G.729.1, a scalable variable data rate codec is described that is compatible with G.729 but can assist in Quality of Service through adaptive bit rates after transmission at intermediate nodes (S. Ragot, et al., "ITU-T G.729.1: An 8-32 kbit/w scalable coder interoperable with G.729 for wideband telephony and voice over IP," in Proceedings of the IEEE International Conference on Acoustics, Speech, and Signal Processing, vol. 4, pp. 529-532, Apr. 15-20, 2007).

Variable data rate voice compression technology is dominated by several techniques. The first technique relies on voice activity detection (VAD) and is employed in modern day cellular and voice over Internet protocol (VoIP) systems. The main voice compression CODECs used in modern systems are the adaptive multi-rate (AMR) codec for GSM, the EVRC-B codec from Qualcomm for 1xEVDO, and Speex for open source VoIP applications (3GPP TS 26.104: ANSI-C code for the floating-point Adaptive Multi-Rate (AMR) speech codec, 3GPP2 TSG-C C.R0018-C v1.0: Software Distribution for Enhanced Variable Rate Codec (EVRC), Speech Service Options 3, 68, and 70, Minimum Performance Specification January 2008, Speex: a free codec for free speech). AMR implements a discontinuous transmission method to achieve variable rate transmission. Additional rate adjustments must be made prior to using their encoder. The EVRC-B code achieves variable rate transmission by using a discontinuous transmission method like the AMR codec. The Speex codec uses a different approach to achieve variable rate transmission. Speex bases its quantization on the actual speech which allows it to achieve better performance in variable data rate (VDR) applications. In the new ITU-T standard G.729.1, a scalable variable data rate codec is described that is compatible with G.729 but can assist in Quality of Service through adaptive bit rates after transmission at intermediate nodes (S. Ragot, et al., "ITU-T G.729.1: An 8-32 kbit/w scalable coder interoperable with G.729 for wideband telephony and voice over IP," in Proceedings of the IEEE International Conference on Acoustics, Speech, and Signal Processing, vol. 4, pp. 529-532, Apr. 15-20, 2007).

Variable data rate communication is relatively new for sensor technology and voice communication. Until recently the majority of communication systems were designed for fixed bandwidth applications. Migrating to modern variable data rate communication systems has improved signal-to-noise ratio (SNR) of signals, Mean Opinion Score (MOS), decreased the outage probability, and increased the channel capacity of the communication links and networks.

Sensor networks are becoming common place with the decreasing cost and power requirements. These networks allow multiple types of information to be transmitted at various transmission rates. Newer systems allow feedback that can increase the efficiency of the system. One example might be to make more efficient use of water resources by decreasing water runoff through smart watering systems which protect from over-watering and under-watering.

Recently, there have been several efforts to implement security for VoIP but all these methods do not implement security efficiently. These methods increase bandwidth by viewing security as a blanket without knowledge of the underlying data being transmitted. Our goal is to develop security methodologies for VoIP which take into consideration the limited available bandwidth of Narrowband network technologies.

The primary challenge with implementing Secure Variable Data Rate (SVDR) implementations is minimizing the overhead due to adding security for variable data rate digital communications. Traditional techniques for implementing secure digital communications consist of padding the data of size (I) with size (p) for encryption and transmitting the entire encrypted data of size (I+p) with additional overhead due to Medium Access Control (MAC) header, Internet Protocol (IP) packet header, User Datagram Protocol (UDP) packet header, and optional Real-time Transport Protocol (RTP) packet header. Newer secure streaming media methods such as Secure Real-time Transport Protocol (SRTP) make use of the RTP header for determining the initialization vector for decrypting using segmented counter mode or f8 mode.

The present invention focuses on improving the bandwidth efficiency of secure variable data rate communication. While there exist several ways to implement secure digital communication and several ways to implement secure variable data rate digital communication, additional bandwidth efficiency can be gained if more bandwidth efficient secure variable data rate digital communication methods are used. What is needed is a systematic method for implementing secure variable data rate digital communications that reduces bandwidth overhead.

BRIEF SUMMARY OF THE INVENTION

The present invention provides an efficient low bandwidth implementation of secure variable data rate communication and describes a method for efficiently implementing low bandwidth secure variable data rate technology.

In accordance with the present invention, the secure variable data rate digital communication consists of information which is private referred to as variable data rate (VDR) digital communication and information which is transmitted over public networks referred to as secure variable data rate (SVDR) digital communication. An example is the problem of securing Voice over Internet Protocol (VoIP) when using variable data rate audio codecs. These codecs can produce encoded audio frames of varying lengths depending on the quantization method and how much information is contained in the original speech segment. Another example is for sensor networks where multiple sensor information packets are collected but transmitted together at different rates. Both transmitter and receiver know how to decode packets but they may not want to use the additional overhead associated with fixed encryption technologies for all packets. The SVDR method will take the variable data length into account in determining the amount of secure data to transmit. In this manner, the SVDR method can optimize itself depending on the input VDR data.

Further embodiments, features, and advantages of the present invention, along with structure and operation of various embodiments of the present invention, are discussed in detail below with reference to the accompanying figures.

BRIEF DESCRIPTION OF THE DRAWINGS/FIGURES

The present invention is described with reference to the accompanying figures. In the figures, like reference numbers indicate identical or functionally similar elements. Additionally, the left-most digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

FIG. 1. illustrates the Secure Transceiver Block Diagram.

Figure 2:
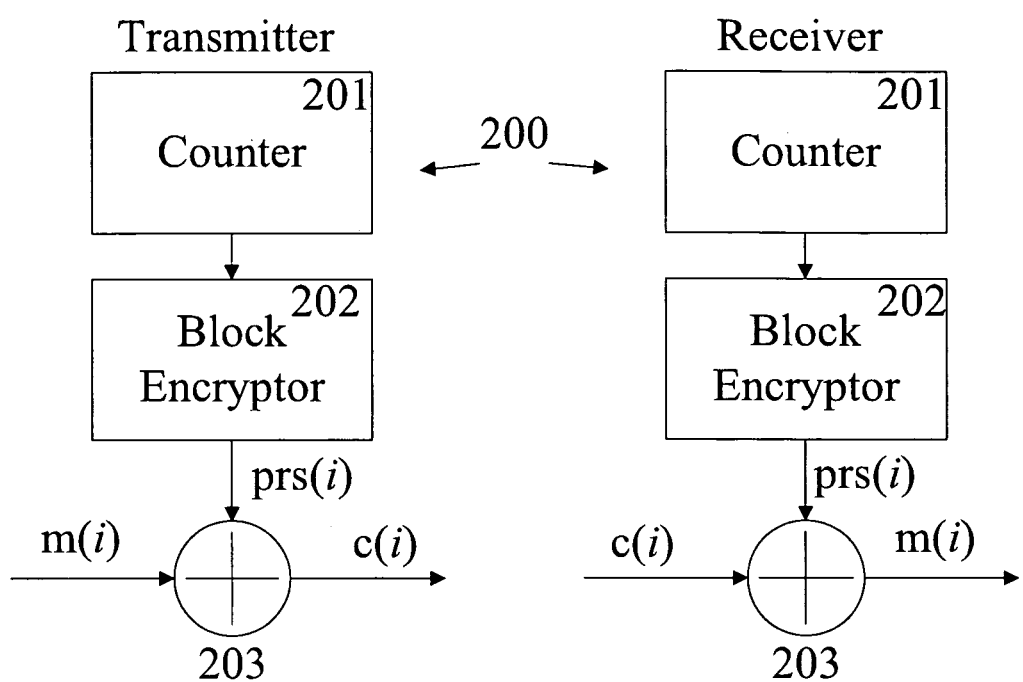

FIG. 2. illustrates the Streaming Media Encryptor/Decryptor Model.

Figure 3:
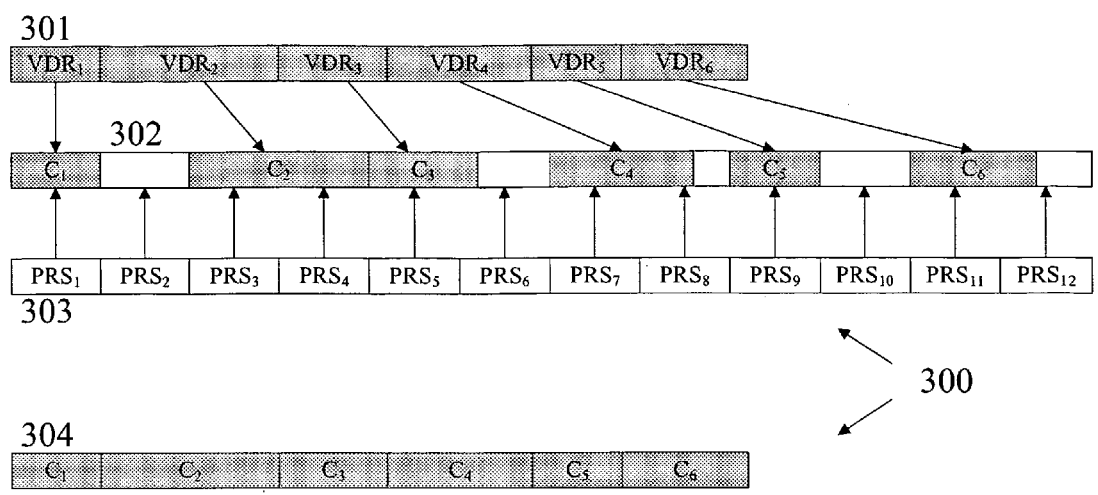

FIG. 3. illustrates the Secure Variable Data Rate Index Method.

Figure 4:
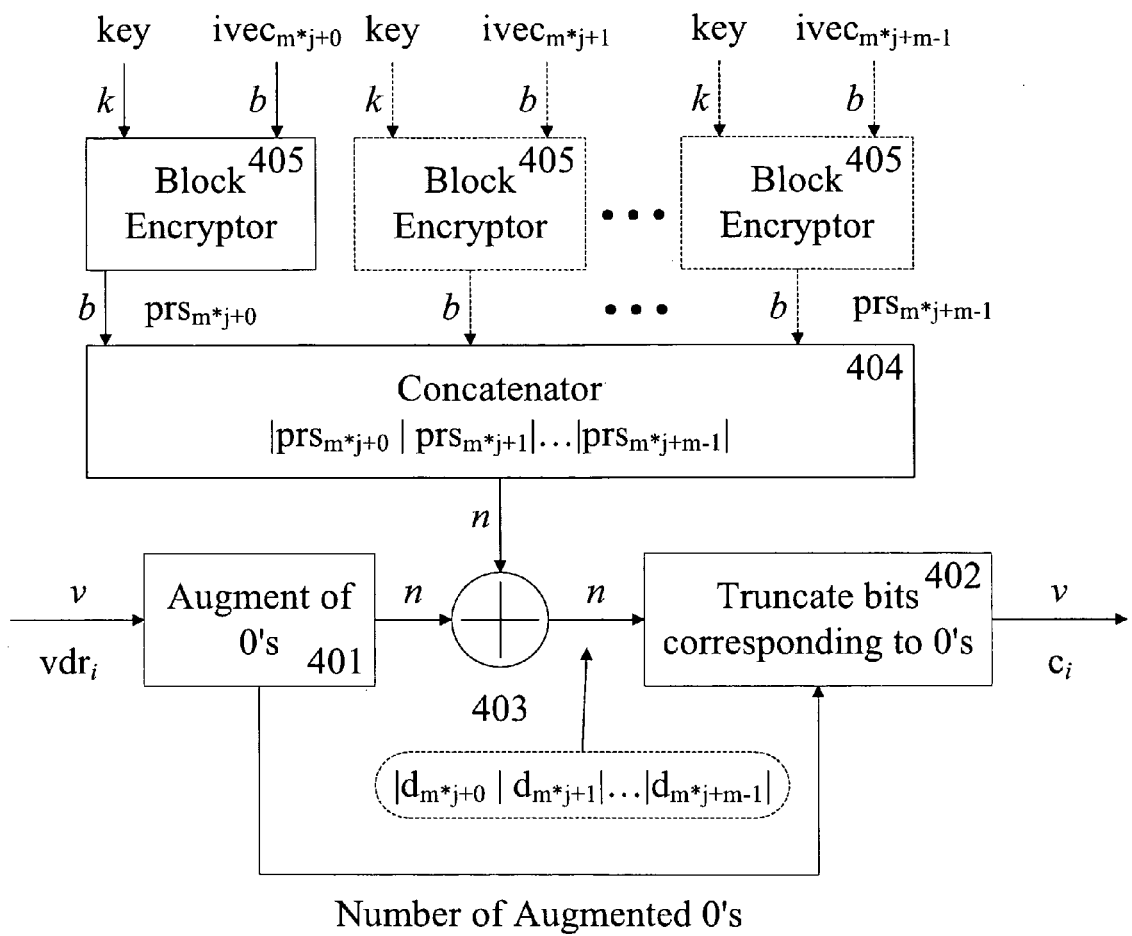

FIG. 4. illustrates the Secure Variable Data Rate Encryptor Block Diagram.

Figure 5:
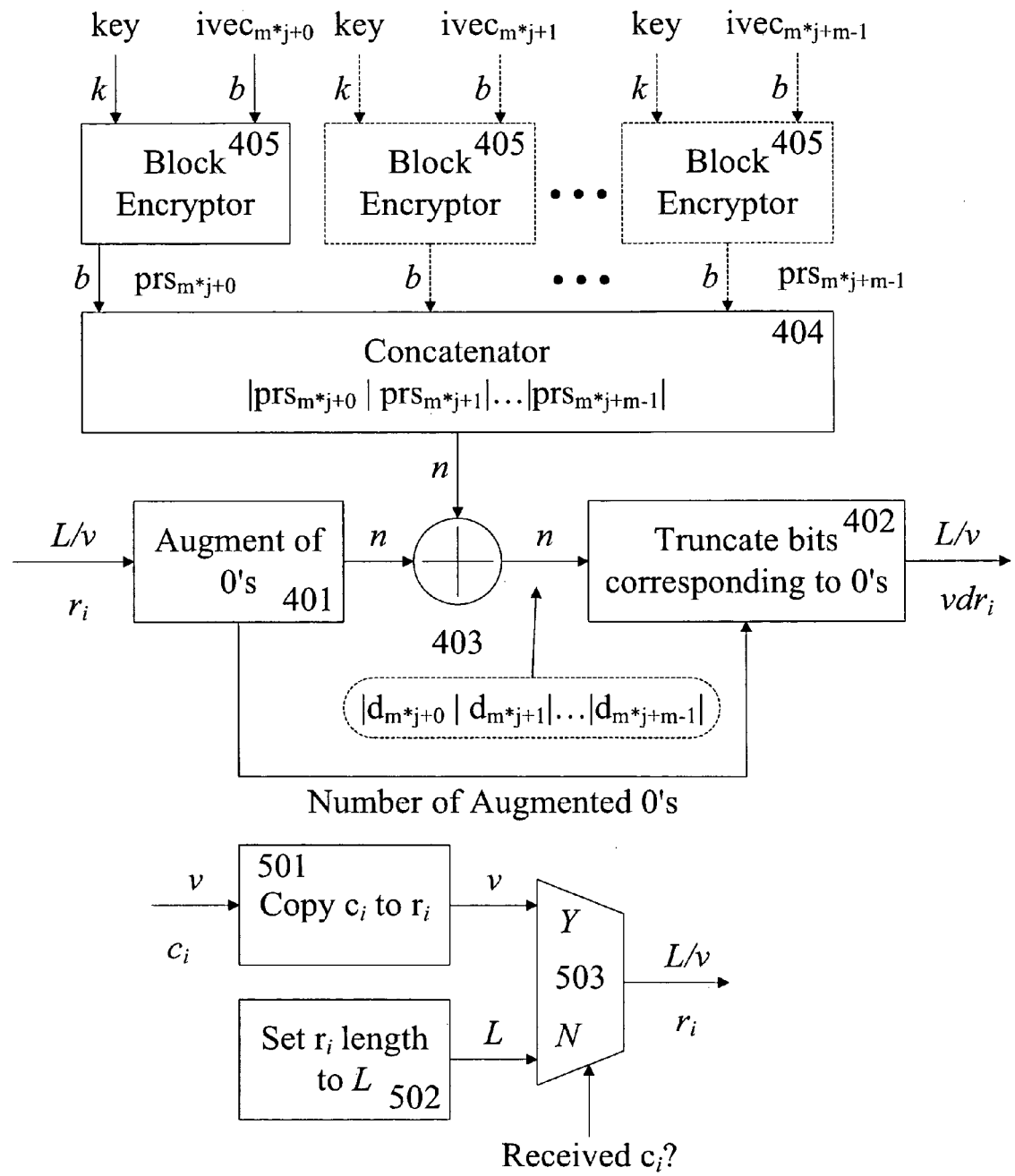

FIG. 5. illustrates the Secure Variable Data Rate Decryptor Block Diagram.

Figure 6:
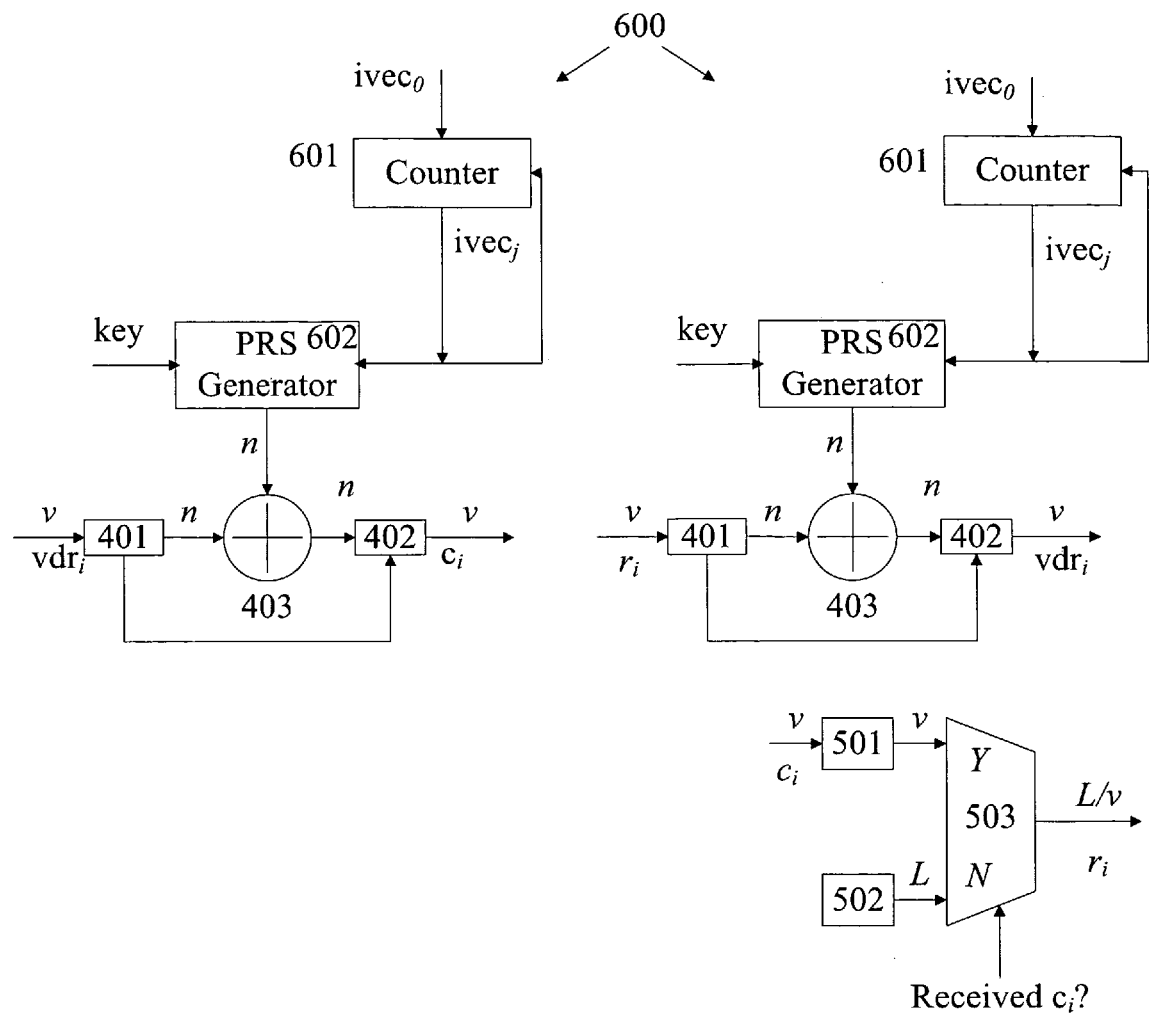

FIG. 6. illustrates the Secure Variable Data Rate Index Method using AES CTR mode.

Figure 7:
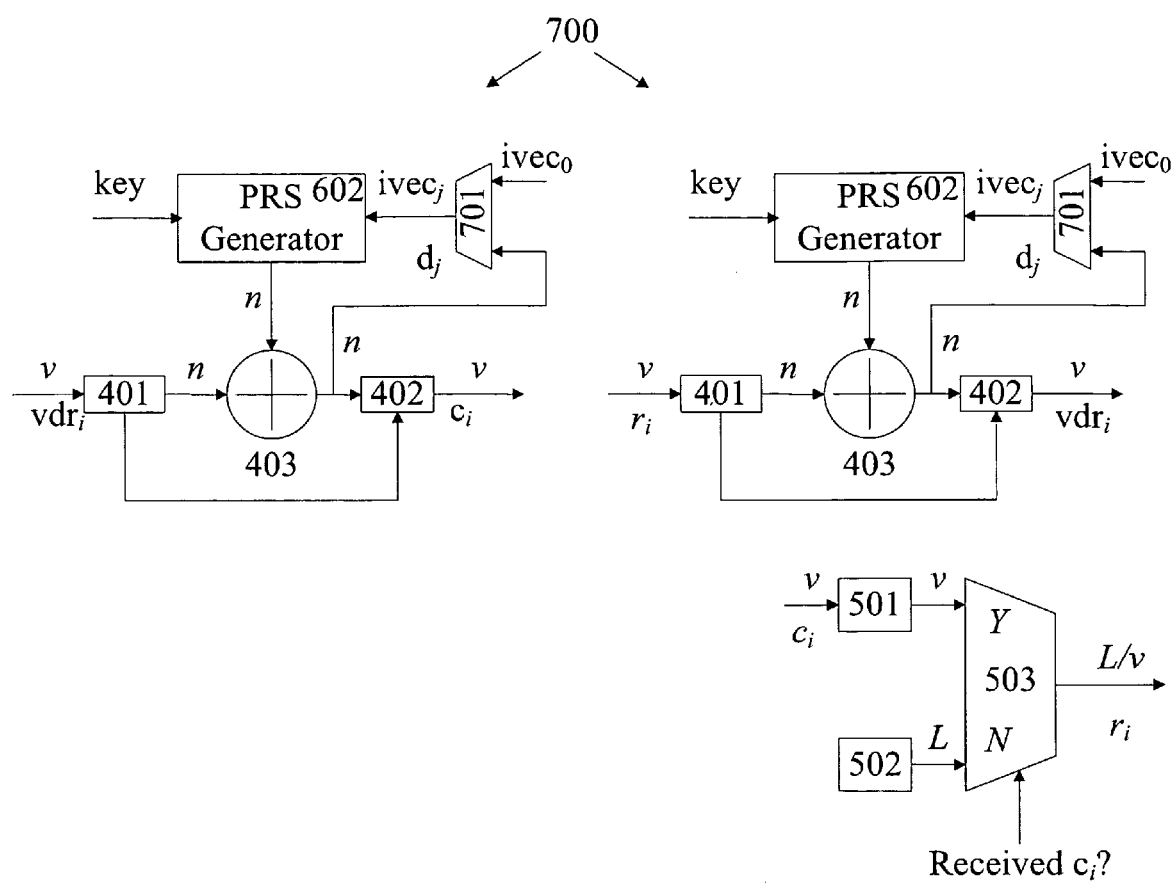

FIG. 7. illustrates the Secure Variable Data Rate Index Method using AES CFB mode.

Figure 8:
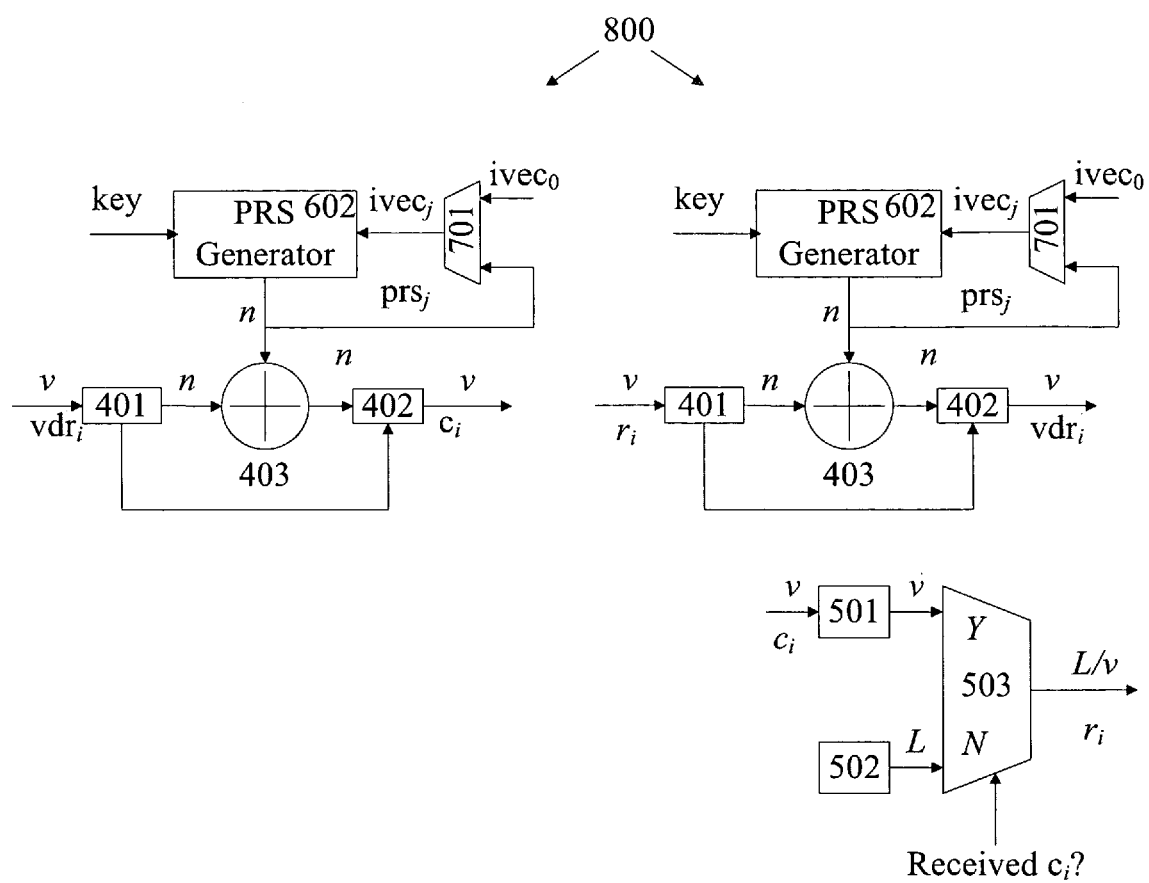

FIG. 8. illustrates the Secure Variable Data Rate Index Method using AES OFB mode.

Figure 9:
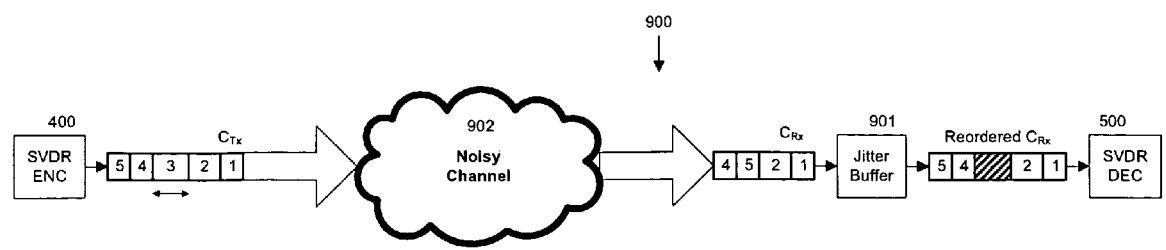

FIG. 9. illustrates lost packets with Secure Variable Data Rate streaming media.

FIG. 10. illustrates a comparison between sequence numbering methods.

DETAILED DESCRIPTION OF THE INVENTION

Modern digital communication networks suffer from the ability of malicious attackers eavesdropping on all digital communications. To prevent eavesdropping on private digital communications across public communication media/networks, encryption technology is used to secure the transmission media. Additionally, modern systems employ variable data rate (VDR) transmissions. Traditional secure transmissions rely on fixed length transmissions but modern variable length transmissions require a new method for implementing security.

A typical secure variable data rate transceiver is shown in FIG. 1 by circuit 100. This consists of a source coder, stream encryptor, and redundancy coder on the transmitter side. The source coder is responsible for converting the constant data rate (CDR) information bits into variable data rate (VDR) information bits. The stream encryptor encrypts the VDR bits using a stream cipher to generate an encrypted VDR stream. The redundancy coder adds redundancy to the information prior to transmission to reduce the likelihood of transmission errors. The receiver side is composed of a redundancy decoder, stream decryptor, and a source decoder. The redundancy decoder checks and corrects transmission errors. The stream decryptor decrypts the encrypted VDR stream. The source decoder converts the VDR information bits back into CDR information bits that can be interpreted correctly.

Circuit 100 consists of blocks 101, 102, 103, and 104. Block 101 is a source coder. In an embodiment, block 101 is a video coder. In another embodiment block 101 is an audio coder. In other embodiments, other coders may be used. Block 102 is a stream encryptor. In an embodiment, block 102 is AES in cipher mode Counter (CTR) mode. In another embodiment, block 102 is AES in cipher mode Output Feedback (OFB) mode. In other embodiments, other stream encryptors may be used. Block 103 is a redundancy coder. In an embodiment block 103 is a Low Density Parity Check (LDPC) encoder. In another embodiment block 103 is a Reed Solomon encoder. In other embodiments, other redundancy coders such as BCH encoders or turbo encoders may be used. Block 104 is the channel. In an embodiment, block 104 is a wireless channel. In another embodiment, block 104 is an Ethernet channel. In other embodiments, other channels may be used. Block 105 is a source decoder. In an embodiment, block 105 is a video decoder. In another embodiment block 105 is an audio decoder. In other embodiments, other decoders may be used. Block 106 is a stream decryptor. In an embodiment, block 106 is AES in cipher mode Counter (CTR) mode. In another embodiment, block 106 is AES in cipher mode Output Feedback (OFB) mode. In other embodiments, other stream decryptors may be used. Block 107 is a redundancy decoder. In an embodiment block 107 is a Low Density Parity Check (LDPC) decoder. In another embodiment block 107 is a Reed Solomon decoder. In other embodiments, other redundancy decoders such as BCH decoders or turbo decoders may be used.

Circuit 100 consists of a secure transmitter and a secure receiver. The transmitter consists of blocks 101, 102, and 103. The receiver consists of blocks 105, 106, and 107. Input data goes into the source coder block 101 and is converted to an efficient digital representation which is the output. The output from block 101 is the input to block 102. Block 102 takes the input insecure data and converts it to an output secure representation. The output from block 102 is the input to block 103. Block 103 takes the secure representation and adds redundancy to it to ensure successful transmission and decryption on the receiver side. The output of block 103 is the input to block 104. Block 104 is the channel and can introduce errors into the data representation. The output of block 104 is the input to block 107 the redundancy decoder. Block 107 removes the redundancy and corrects errors. The output of block 107 is the secure representation which is the input to block 106. Block 106 takes the secure representation and decrypts it to generate the source coded format. The output of block 106 is the input to block 105. Block 105 takes the source coded efficient digital representation and converts it to the original data.

One type of stream encryptor/decryptor can be seen in FIG. 2 by circuit 200. This stream encryptor/decryptor was designed using a standard block cipher and the exclusive OR (XOR) operation.

Circuit 200 consists of blocks 201, 202, and 203. Block 201 is a counter to update the initialization vector. In an embodiment, block 201 is a counter. In other embodiments, other methods may be used. Block 202 is a block encryptor. In an embodiment, block 202 is an Advanced Encryption Standard (AES) block cipher. In other embodiments, other block ciphers may be used. Block 203 is a parallel exclusive OR array. In an embodiment, block 203 is implemented with an array of exclusive OR units. In another embodiment, block 203 is implemented with a read only memory (ROM). In other embodiments, other methods may be used.

Circuit 200 consists of a secure transmitter and a secure receiver. The secure transmitter method consists of blocks 201, 202, and 203. Block 201 updates the initialization vector. The initialization vector is input to the block encryptor. Block 202 consists of the block encryptor which generates a pseudo-random stream based on the original initialization vector and block 201 updating the initialization vector. Block 203 performs the exclusive OR operation of the input (message (m)) bits with the pseudo random stream (PRS) generated bits. The result is the cipherstream (c) bits. The secure receiver method consists of blocks 201, 202, and 203. Block 201 updates the initialization vector. The initialization vector is input to the block encryptor. Block 202 consists of the block encryptor which generates a pseudo-random stream based on the original initialization vector and updates to the initialization vector, performed by block 201, as in the stream transmitter. Block 203 performs the exclusive OR operation but with the input and output reversed from the secure stream transmitter. The inputs are the cipherstream (c) and the pseudo-random stream (PRS) with the output of the message (m) bits.

FIG. 3 contains circuit 300 a diagram showing how the VDR information bits, $VDR_i$, and the pseudo random stream groups of fixed length ($PRS_i$), are combined to perform streaming encryption for bandwidth efficiency. There exists several cipher modes (algorithms) which produce a Psuedo Random Stream (PRS) based on a block cipher. Our technique makes use of the PRS to perform encryption but instead of aligning the VDR data, our technique makes the VDR data appear to be fixed length data to the cipher mode algorithm. After the VDR data is encrypted then the transmitter only transmits the valid encrypted portion, $C_i$, in FIG. 3 by circuit 300.

Circuit 300 consists of blocks 301, 302, 303, and 304. Block 301 consists of the variable data rate (VDR) stream data. In an embodiment, block 301 is generated by a variable data rate coder. In other embodiments, other methods may be used. Block 302 consists of the secure variable data rate (SVDR) stream aligned with the pseudo random stream (PRS). In an embodiment, block 302 is generated by a software program. In other embodiments, other methods may be used to generate block 302. Block 303 consists of the pseudo random stream (PRS) data. In an embodiment block 303 is generated by a cipher mode with the Advanced Encryption Standard (AES). In other embodiments, other methods may be used. Block 304 consists of the actual SVDR data that will be transmitted.

Circuit 300 illustrates how the secure variable data rate (SVDR) stream, variable data rate (VDR) stream, and the pseudo random stream (PRS) are related. The inputs are the variable data rate (VDR) stream from block 301 and the pseudo random stream (PRS) from block 303. The output is the secure variable data rate (SVDR) stream illustrated in block 302 and block 304. To generate block 304 several bits from the PRS are discarded which are shown in block 302 with a white background.

The SVDR technique can be described with the following equations.

$$P\_i = VDR\_i \| \text{Padding}(\text{MAXLEN} - \text{size}(VDR\_i))$$

$$C\_i = P\_i \operatorname{xor} PRS\_i$$

$$= VDR\_i \operatorname{xor} PRS\_i(\text{size}(VDR\_i)) \| \ldots$$

Where VDR_i is the i-th VDR output frame, P_i is the plaintext packet consisting of the i-th VDR output frame plus padding to make P_i equal to the maximum packet length, PRS_i is the i-th pseudo-random-stream chunk of size equal to the maximum packet length, and C_i is the ciphertext consisting of the exclusive OR of P_i with PRS_i.

Then the transmitter transmits C_i but only the required bits which are equal to the size of the VDR_i frame. This implementation allows the transmitter and receiver to encrypt and decrypt as if the data is fixed length but then to use the bandwidth efficiently by transmitting only the encrypted VDR data. FIG. 4 provides an example circuit 400 of the secure variable data rate encryptor block diagram. FIG. 5 provides an example circuit 500 of the secure variable data rate decryptor block diagram. FIG. 6 provides an example circuit 600 of the SVDR method using the AES CTR mode to generate the PRS. FIG. 7 provides an example circuit 700 of the SVDR method using the AES CFB mode to generate the PRS. FIG. 8 provides an example circuit 800 of the SVDR method using the AES OFB mode to generate the PRS.

Circuit 400 consists of blocks 401, 402, 403, 404, and 405. Block 401 is an augment of 0's block. In an embodiment, block 401 is implemented by a padding of zeros. In another embodiment, block 401 is implemented by a padding of random values. In another embodiment, block 401 is implemented as a random mapping of input values to output values. In other embodiments, other methods may be used. Block 402 is a truncate bits corresponding to 0's block. In an embodiment, block 402 is implemented by a truncation block. In another embodiment, block 402 is implemented as a random mapping of input values to output values corresponding to the reverse operation of block 401. In other embodiments other methods may be used. Block 403 is a parallel exclusive-Or block. In an embodiment, block 403 is implemented by an exclusive-Or array. In another embodiment, block 403 is implemented by a look-up-table. In other embodiments other methods may be used. Block 404 is a concatenator block. In an embodiment block 404 is implemented by a routing network. In another embodiment, block 404 is implemented by a controller writing to memory. In other embodiments, other methods may be used. Block 405 is a block encryptor. In an embodiment block 405 is implemented by an Advanced Encryption Standard (AES) encryptor. In another embodiment, block 405 is implemented by a Data Encryption Standard (DES) encryptor. In other embodiments, other methods may be used.

Circuit 400 consists of the secure variable data rate (SVDR) encryptor block diagram. Circuit 400 operates as follows. The input variable data rate (VDR) data of length v is labeled by $vdr_i$. The maximum size of the variable data rate data is length n. This data is connected as input to block 401. Block 401 maps the input data ($vdr_i$) of length v to the output data of length n connected to block 403. The output of block 401 consists of length n data connected to block 403 and the number of augmented 0's connected to block 402. Block 403 maps the two input vectors of length n one coming from block 401 and the other coming from block 404 to the output data of length n (connected to block 402) based on the exclusive-Or operation. Block 402 maps the input data of length n coming from block 403 to the output data of length v based on the input number of augmented 0's coming from block 401. Unused values are discarded. Block 404 maps the input data of length b from one or more blocks (block 405 in circuit 400). Length b is the length of the block size. When length b is greater than or equal to length n, then there is only one block 405. When length n is greater than length b then there is more than one block 405. The total number of required block 405 structures is equal to floor(n/b)+1. Block 405 is a block encryptor. Its purpose is to take the inputs: key of length k, ivec of length b, and generate the output prs of length b. The output of block 405 (labeled $prs_{m*j+...}$) is connected as input to block 404.

Circuit 500 consists of blocks 401, 402, 403, 404, 405, 501, 502, and 503. Blocks 401 to 405 are identical in functionality to circuit 400. Block 501 is a copy block for copying $c_i$ to $r_i$. In an embodiment, block 501 is implemented by a routing network. In another embodiment, block 501 is implemented with random access memory (RAM). In another embodiment other methods may be used. Block 502 is a set $r_i$ to zero block. In an embodiment, block 502 is implemented as wires connected to ground. In other embodiments, other methods may be used. Block 503 is a control block. In an embodiment, block 503 is implemented by a multiplexor. In another embodiment, block 503 is implemented by an if-then-else statement. In other embodiments, other methods may be used.

Circuit 500 consists of the secure variable data rate (SVDR) decryptor block diagram. Circuit 500 operates as follows. The input variable data rate ciphertext ($c_i$) data of length v is labeled by $c_i$. The maximum size of the $c_i$ data is length n. This data is connected as input to block 501. Block 501 maps the input data ($c_i$) of length v to the output data ($r_i$) of length v connected to block 503 in the Y position. Block 502 sets the value of the length to 0 as output which is connected to block 503 in the N position. Block 503 is a control block that selects between the Yes (Y) position and the No (N) position based on the input labeled (Received $c_i$?). The No position indicates that the ciphertext data was lost in transmission and that the pseudorandom stream must be advanced to the next position. The Yes position indicates that the system is performing a decryption that performs the opposite of the encryption method. The output of block 503 is the input to block 401 for circuit 500. The output of block 402 can be of length 0 or of length v depending on if the (Received $c_i$?) value is Y or N.

Circuit 600 consists of blocks 401, 402, 403, 501, 502, 503, 601, and 602. Blocks 401, 402, 403, 501, 502, 503 are identical to the blocks described in circuits 400 and 500. Block 601 is an initialization vector counter update block. In an embodiment, block 601 is implemented by a counter. In another embodiment, block 601 is implemented by an arithmetic logic unit. In other embodiments, other methods may be used. Block 602 is a pseudo random-number stream (PRS) generator. In an embodiment, block 602 is implemented by a block encryptor such as the Advanced Encryption Standard (AES) or the Data Encryption Standard (DES). In another embodiment, block 602 is implemented by a stream cipher such as RC4. In other embodiments, other methods may be used.

Circuit 600 consists of the secure variable data rate (SVDR) encryptor and decryptor using counter (CTR) mode. Circuit 600 operates as follows. First, the simplified SVDR encryptor circuit diagram operates as follows. The initial ivec0 is connected to block 601 of the SVDR encryptor. Upon start the $ivec_j$ is equal to $ivec_0$. After the initial start the counter takes the previous $ivec_{j-1}$ value and updates it by incrementing to generate the $ivec_j$ value. The output $ivec_j$ along with the input key are connected to block 602 of the SVDR encryptor. Block 602 uses these values to generate a $prs_i$ output. The $prs_i$ output of block 602 of the SVDR encryptor is connected to block 403 of the SVDR encryptor. The input variable data rate ($vdr_i$) packet of length v is connected to block 401 of the SVDR encryptor. Block 401 of the SVDR encryptor augments the packet by increasing the length to n and outputs that value to block 403 of the SVDR encryptor and the length v to block 402 of the SVDR encryptor. Block 403 of the SVDR encryptor takes the output of block 401 of the SVDR encryptor and block 602 of the SVDR encryptor and generates the exclusive or of those two values as output to block 402 of the SVDR encryptor. Block 402 of the SVDR encryptor takes the output from block 403 of the SVDR encryptor and the length v from block 401 of the SVDR encryptor and decreases the length of the output by (n−v) and outputs the ciphertext ($c_i$). Second, the simplified SVDR decryptor circuit diagram operates as follows. The initial ivec0 is connected to block 601 of the SVDR decryptor. Upon start the $ivec_j$ is equal to $ivec_0$. After the initial start the counter takes the previous $ivec_{j-1}$ value and updates it by incrementing to generate the $ivec_j$ value. The output $ivec_j$ along with the input key are connected to block 602 of the SVDR decryptor. Block 602 of the SVDR decryptor uses these values to generate a $prs_i$ output. The $prs_i$ output of block 602 of the SVDR decryptor is connected to block 403 of the SVDR decryptor. The input ciphertext ($c_i$) is connected to block 501 of the SVDR decryptor which has output connected to block 503 of the SVDR decryptor. The output of block 501 of the SVDR decryptor is equivalent to the input of block 501 of the SVDR decryptor. Block 502 of the SVDR decryptor generates a dummy packet of length L as output to block 503 of the SVDR decryptor. Block 503 of the SVDR decryptor takes input determining if a packet was "received ci?" and selects the input from block 501 of the SVDR decryptor or the input from block 502 of the SVDR decryptor to pass as output $r_i$ of length L or length v to block 401 of the SVDR decryptor. If $c_i$ was received then $c_i$ is passed as output of block 503 of the SVDR decryptor labeled $r_i$ in the figure. The input $r_i$ of length L or v is connected to block 401 of the SVDR decryptor. Block 401 of the SVDR decryptor augments the packet by increasing the length to n and outputs that value to block 403 of the SVDR decryptor and the length v to block 402 of the SVDR decryptor. Block 403 of the SVDR decryptor takes the output of block 401 of the SVDR decryptor and block 602 of the SVDR decryptor and generates the exclusive or of those two values as output to block 402 of the SVDR decryptor. Block 402 of the SVDR decryptor takes the output from block 403 of the SVDR decryptor and the length v from block 401 of the SVDR decryptor and decreases the length of the output by (n−v) and outputs the decrypted variable data rate ($vdr_i$) packet.

Circuit 700 consists of blocks 401, 402, 403, 501, 502, 503, 602, and 701. Blocks 401, 402, 403, 501, 502, 503 are identical to the blocks described in circuits 400 and 500. Block 602 is identical to block 602 in circuit 600. Block 602 is a pseudo random-number stream (PRS) generator. In an embodiment, block 602 is implemented by a block encryptor such as the Advanced Encryption Standard (AES) or the Data Encryption Standard (DES). In another embodiment, block 602 is implemented by a stream cipher such as RC4. In other embodiments, other methods may be used. Block 701 is an initialization vector update block. In an embodiment, block 701 is implemented by a multiplexor. In another embodiment, block 701 is implemented by an if-then-else statement. In other embodiments, other methods may be used.

Circuit 700 consists of the secure variable data rate (SVDR) encryptor and decryptor using cipher feedback (CFB) mode. Circuit 700 operates as follows. First, the simplified SVDR encryptor circuit diagram operates as follows. The initial ivec0 is connected to block 701 of the SVDR encryptor. Upon start the $ivec_j$ is equal to $ivec_0$. After the initial start, block 701 of the SVDR encryptor takes the cipher ($d_{j-1}$) value and passes it to the output $ivec_j$ value. The output $ivec_j$ along with the input key are connected to block 602 of the SVDR encryptor. Block 602 uses these values to generate a $prs_i$ output. The $prs_i$ output of block 602 of the SVDR encryptor is connected to block 403 of the SVDR encryptor.

The input variable data rate ($vdr_i$) packet of length v is connected to block 401 of the SVDR encryptor. Block 401 of the SVDR encryptor augments the packet by increasing the length to n and outputs that value to block 403 of the SVDR encryptor and the length v to block 402 of the SVDR encryptor. Block 403 of the SVDR encryptor takes the output of block 401 of the SVDR encryptor and block 602 of the SVDR encryptor and generates the exclusive or of those two values as output to block 402 of the SVDR encryptor. Block 402 of the SVDR encryptor takes the output from block 403 of the SVDR encryptor and the length v from block 401 of the SVDR encryptor and decreases the length of the output by (n−v) and outputs the ciphertext ($c_i$). Second, the simplified SVDR decryptor circuit diagram operates as follows. The initial ivec0 is connected to block 601 of the SVDR decryptor. Upon start the $ivec_j$ is equal to $ivec_0$. After the initial start, block 701 of the SVDR decryptor takes the cipher ($d_{j-1}$) value and passes it to the output $ivec_j$ value. The output $ivec_j$ along with the input key are connected to block 602 of the SVDR decryptor. Block 602 of the SVDR decryptor uses these values to generate a $prs_i$ output. The $prs_i$ output of block 602 of the SVDR decryptor is connected to block 403 of the SVDR decryptor. The input ciphertext ($c_i$) is connected to block 501 of the SVDR decryptor which has output connected to block 503 of the SVDR decryptor. The output of block 501 of the SVDR decryptor is equivalent to the input of block 501 of the SVDR decryptor. Block 502 of the SVDR decryptor generates a dummy packet of length L as output to block 503 of the SVDR decryptor. Block 503 of the SVDR decryptor takes input determining if a packet was "received ci?" and selects the input from block 501 of the SVDR decryptor or the input from block 502 of the SVDR decryptor to pass as output $r_i$ of length L or length v to block 401 of the SVDR decryptor. If $c_i$ was received then $c_i$ is passed as output of block 503 of the SVDR decryptor labeled $r_i$ in the figure. The input $r_i$ of length L or v is connected to block 401 of the SVDR decryptor. Block 401 of the SVDR decryptor augments the packet by increasing the length to n and outputs that value to block 403 of the SVDR decryptor and the length v to block 402 of the SVDR decryptor. Block 403 of the SVDR decryptor takes the output of block 401 of the SVDR decryptor and block 602 of the SVDR decryptor and generates the exclusive or of those two values as output to block 402 of the SVDR decryptor. Block 402 of the SVDR decryptor takes the output from block 403 of the SVDR decryptor and the length v from block 401 of the SVDR decryptor and decreases the length of the output by (n−v) and outputs the decrypted variable data rate ($vdr_i$) packet.

Circuit 800 consists of blocks 401, 402, 403, 501, 502, 503, 602, and 701. Blocks 401, 402, 403, 501, 502, 503 are identical to the blocks described in circuits 400 and 500. Block 602 and 701 are identical to blocks 602 and 701 in circuit 700. Block 602 is a pseudo random-number stream (PRS) generator. In an embodiment, block 602 is implemented by a block encryptor such as the Advanced Encryption Standard (AES) or the Data Encryption Standard (DES). In another embodiment, block 602 is implemented by a stream cipher such as RC4. In other embodiments, other methods may be used. Block 701 is an initialization vector update block. In an embodiment, block 701 is implemented by a multiplexor. In another embodiment, block 701 is implemented by an if-then-else statement. In other embodiments, other methods may be used.

Circuit 800 consists of the secure variable data rate (SVDR) encryptor and decryptor using output feedback (OFB) mode. Circuit 800 operates as follows. First, the simplified SVDR encryptor circuit diagram operates as follows.

The initial ivec0 is connected to block 701 of the SVDR encryptor. Upon start the $ivec_j$ is equal to $ivec_0$. After the initial start, block 701 of the SVDR encryptor takes the pseudo random-number ($prs_{j-1}$) value and passes it to the output $ivec_i$ value. The output $ivec_3$ along with the input key are connected to block 602 of the SVDR encryptor. Block 602 uses these values to generate a $prs_i$ output. The $prs_i$ output of block 602 of the SVDR encryptor is connected to block 403 of the SVDR encryptor. The input variable data rate ($vdr_i$) packet of length v is connected to block 401 of the SVDR encryptor. Block 401 of the SVDR encryptor augments the packet by increasing the length to n and outputs that value to block 403 of the SVDR encryptor and the length v to block 402 of the SVDR encryptor. Block 403 of the SVDR encryptor takes the output of block 401 of the SVDR encryptor and block 602 of the SVDR encryptor and generates the exclusive or of those two values as output to block 402 of the SVDR encryptor. Block 402 of the SVDR encryptor takes the output from block 403 of the SVDR encryptor and the length v from block 401 of the SVDR encryptor and decreases the length of the output by (n−v) and outputs the ciphertext ($c_1$). Second, the simplified SVDR decryptor circuit diagram operates as follows. The initial ivec0 is connected to block 601 of the SVDR decryptor. Upon start the $ivec_j$ is equal to $ivec_0$. After the initial start, block 701 of the SVDR decryptor takes the pseudo random-number ($prs_{j-1}$) value and passes it to the output $ivec_j$ value. The output $ivec_j$ along with the input key are connected to block 602 of the SVDR decryptor. Block 602 of the SVDR decryptor uses these values to generate a $prs_i$ output. The $prs_i$ output of block 602 of the SVDR decryptor is connected to block 403 of the SVDR decryptor. The input ciphertext ($c_i$) is connected to block 501 of the SVDR decryptor which has output connected to block 503 of the SVDR decryptor. The output of block 501 of the SVDR decryptor is equivalent to the input of block 501 of the SVDR decryptor. Block 502 of the SVDR decryptor generates a dummy packet of length L as output to block 503 of the SVDR decryptor. Block 503 of the SVDR decryptor takes input determining if a packet was "received ci?" and selects the input from block 501 of the SVDR decryptor or the input from block 502 of the SVDR decryptor to pass as output $r_i$ of length L or length v to block 401 of the SVDR decryptor. If $c_i$ was received then $c_i$ is passed as output of block 503 of the SVDR decryptor labeled $r_i$ in the figure. The input $r_i$ of length L or v is connected to block 401 of the SVDR decryptor. Block 401 of the SVDR decryptor augments the packet by increasing the length to n and outputs that value to block 403 of the SVDR decryptor and the length v to block 402 of the SVDR decryptor. Block 403 of the SVDR decryptor takes the output of block 401 of the SVDR decryptor and block 602 of the SVDR decryptor and generates the exclusive or of those two values as output to block 402 of the SVDR decryptor. Block 402 of the SVDR decryptor takes the output from block 403 of the SVDR decryptor and the length v from block 401 of the SVDR decryptor and decreases the length of the output by (n−v) and outputs the decrypted variable data rate ($vdr_i$) packet.

Performance Analysis and Comparison

In certain situations decoding before receiving all packets is necessary as illustrated in FIG. 9 by circuit 900. Examples would be networks with high data packet loss or networks which have high variability in transmission times. For these cases sequence numbers (data offsets) must be transmitted to properly re-align the received data for decoding.

Circuit 900 consists of blocks 400, 500, 901, and 902. Block 400 is the secure variable data rate encryptor described in circuit 400. Block 500 is the secure variable data rate decryptor described in circuit 500. Block 901 is the jitter buffer. In an embodiment, block 901 is implemented with random access memory (RAM). In another embodiment, block 901 is implemented with a stack. In other embodiments, other methods may be used. Block 902 is the noisy channel. In an embodiment, block 902 is a wireless channel. In another embodiment, block 902 is a wired channel. In another embodiment, block 902 is a network. In other embodiments, other methods may be used.

Circuit 900 consists of a secure variable data rate (SVDR) encoder and a secure variable data rate (SVDR) decoder with intermittent dropped packets. Circuit 900 operates as follows. Block 400 generates the SVDR stream with packet indices starting at 1 and continuing until the stream ends or the number overflows. These packets are sent through the noisy channel or network which introduces errors, reorders packets, and causes packets to become lost. The packets arrive at block 901. Block 901 is the jitter buffer and it takes the packets and reorders them and fills in the gaps for lost packets. Block 901 generates an output packet flow that resembles the original packet flow but with some slight changes caused by block 902. Finally, block 500 receives the reordered packets which it can decrypt to obtain the desired output. This final output differs from the original input to block 400 because of the lost packets and any transmission errors.

For the example from FIG. 9 where packet 3 was dropped there are 3 possible solutions that were considered for secure VDR implementation. Solution 1 is to index by bit. Its index will be size(1)+size(2)+size(3). Solution 2 is to use separate streams for the VDR information. This method will index by block but will require discarding stream bits unless additional indices are used. The overhead for the additional indices and number of separate streams depends on the number of possible VDR sizes. Solution 3 is to index by block. Its index will be max(1)+max(2)+max(3). The difference between solution 3's index and solution 1's index is (max(1)-size(1))+(max(2)-size(2))+(max(3)-size(3)). While it increases the number of unused bits in the pseudo random stream it decreases the required number of bits to transmit the sequence information. FIG. 8 presents a comparison of the possible solutions to the sequence number problem.

Solution 1 has the highest communication overhead and therefore it is not considered as a viable solution. Solution 2 makes use of several streams but requires significant overhead in setup time due to the amount of information required for (the total number of priority levels) separate pseudorandom streams. Therefore it is not a viable option. The last option (solution 3, the proposed method) is to discard bits from the pseudorandom stream and index by block. While this is not ideal as it wastes bits it makes better use of the limited bandwidth by using sequence numbers indexed by max frame size and requires a shorter setup time for the pseudorandom streams.

In an example, for window sizes of 10 and 7 priority levels, the proposed method (solution 3) requires 4 bits instead of 13 bits (solution 1) for sequence number encoding. This leads to at most a 70% reduction in the transmission overhead required for security by saving 9 bits. Additionally, it requires a shorter setup time and lower transmission overhead than solution 2 which requires setting up a stream for each available priority level if used or not used. Comparisons of the different solutions in this example are illustrated in the table in FIG. 10 with the total number of priority levels set to 7.

Conclusions

This invention presents a novel technique for efficiently implementing secure variable data rate (VDR) encryption. This method can be applied to secure VoIP for narrowband networks, secure VDR data for sensor networks, secure VDR data for medical devices, secure VDR for military applications, and numerous other applications. Our novel method makes more efficient use of the limited bandwidth for transmitting secure variable data rate (VDR) data at the expense of discarding bits in the pseudo random stream. In our tests, for window sizes of 10, this method requires 4 bits instead of 13 bits for sequence number encoding. This leads to at most a 70% reduction in the transmission overhead required for security by saving 9 bits. This is achieved through optimizing for bandwidth usage rather than optimizing the usage of the Psuedo Random Stream (PRS) generated by the stream cipher.

What is claimed is:

1. A secure variable data rate encryption method, comprising:
   Receiving blocks of pseudo-random bits of block length K (K>0 and an integer);
   Receiving a variable data rate packet of length V bits, such that 1<=V<=NK, where N, an integer greater than or equal to 1, is chosen to satisfy NK>=Vmax, where Vmax is the maximum of all variable data rate packet lengths;
   Appending (NK−V) dummy bits at the end of the said variable data rate packet of length V bits to create an augmented packet of length NK bits,
   Computing an encrypted ciphertext packet stream by exclusive-or of the augmented packet and N blocks of pseudo-random sequences each of length K bits;
   Transmitting a first V bits of the encrypted ciphertext after truncating the last (NK−V) bits from the ciphertext of length NK bits.

2. The secure variable data rate encryption method of claim 1 where the pseudorandom sequence is generated by the Advanced Encryption Standard (AES).

3. The secure variable data rate encryption method of claim 1 where the pseudorandom sequence is generated by the Counter (CTR) mode of the AES encryption.

4. The secure variable data rate encryption method of claim 1 where the pseudorandom sequence is generated by the Cipher Feedback (CFB) mode of the AES encryption.

5. The secure variable data rate encryption method of claim 1 where the pseudorandom sequence is generated by the Output Feedback (OFB) mode of the AES encryption.

6. The secure variable data rate encryption method of claim 1 implemented by a machine.

7. A secure variable data rate decryption method comprising:
   receiving blocks of pseudorandom bits of block length K (K>0 and an integer);
   receiving a variable data rate packet of length V bits, such that 1<=V<=NK, where N, an integer greater than or equal to 1, is chosen to satisfy NK>=Vmax, where Vmax is the maximum of all variable data rate packet lengths;
   appending (NK−V) dummy bits at the end of the said variable data rate packet of length V bits to create an augmented packet of length NK bits,
   computing the decrypted ciphertext packet stream by exclusive-or of the augmented packet of length NK bits and N pseudorandom blocks each of length K bits; and
   retaining a first V bits of the decrypted ciphertext after truncating the last (NK−V) bits from the decrypted ciphertext of length NK bits.

8. The secure variable data rate decryption method of claim 7 where the pseudorandom sequence is generated by the Advanced Encryption Standard (AES).

9. The secure variable data rate decryption method of claim 7 where the pseudorandom sequence is generated by the Counter (CTR) mode of the AES encryption.

10. The secure variable data rate decryption method of claim 7 where the pseudorandom sequence is generated by the Cipher Feedback (CFB) mode of the AES encryption.

11. The secure variable data rate decryption method of claim 7 where the pseudorandom sequence is generated by the Output Feedback (OFB) mode of the AES encryption.

12. The secure variable data rate decryption method of claim 7 where the decryptor is implemented using a machine.

13. An integrated circuit that implements a secure variable data rate encryptor, comprising:
    A digital circuit;
    Receiving blocks of pseudo-random bits of block length K (K>0 and an integer);
    Receiving a variable data rate packet of length V bits, such that 1<=V<=NK, where N, an integer greater than or equal to 1, is chosen to satisfy NK>=Vmax, where Vmax is the maximum of all variable data rate packet lengths;
    Appending (NK−V) dummy bits at the end of the said variable data rate packet of length V bits to create an augmented packet of length NK bits,
    Computing an encrypted ciphertext packet stream by exclusive-or of the augmented packet and N blocks of pseudo-random sequences each of length K bits;
    Transmitting a first V bits of the encrypted ciphertext after truncating the last (NK−V) bits from the ciphertext of length NK bits.

14. The secure variable data rate encryptor of claim 13 where the pseudorandom sequence is generated by the Advanced Encryption Standard (AES).

15. The secure variable data rate encryptor of claim 13 where the pseudorandom sequence is generated by the Counter (CTR) mode of the AES encryption.

16. The secure variable data rate encryptor of claim 13 where the pseudorandom sequence is generated by the Cipher Feedback (CFB) mode of the AES encryption.

17. The secure variable data rate encryptor of claim 13 where the pseudorandom sequence is generated by the Output Feedback (OFB) mode of the AES encryption.

18. An integrated circuit that implements a secure variable data rate decryptor, comprising:
    A digital circuit;
    Receiving blocks of pseudorandom bits of block length K (K>0 and an integer);
    Receiving a variable data rate packet of length V bits, such that 1<=V<=NK, where N, an integer greater than or equal to 1, is chosen to satisfy NK>=Vmax, where Vmax is the maximum of all variable data rate packet lengths;
    Appending (NK−V) dummy bits at the end of the said variable data rate packet of length V bits to create an augmented packet of length NK bits;
    Computing the decrypted ciphertext packet stream by exclusive-or of the augmented packet of length NK bits and the N pseudorandom blocks each of length K bits; and
    Retaining a first V bits of the decrypted ciphertext after truncating the last (NK−V) bits from the decrypted ciphertext of length NK bits.

19. The secure variable data rate decryptor of claim 18 where the pseudorandom sequence is generated by the Advanced Encryption Standard (AES).

20. The secure variable data rate decryptor of claim 18 where the pseudorandom sequence is generated by the Counter (CTR) mode of the AES encryption.

21. The secure variable data rate decryptor of claim 18 where the pseudorandom sequence is generated by the Cipher Feedback (CFB) mode of the AES encryption.

22. The secure variable data rate decryptor of claim 18 where the pseudorandom sequence is generated by the Output Feedback (OFB) mode of the AES encryption.

* * * * *